(12) United States Patent
Mayer et al.

(10) Patent No.: US 8,714,323 B2
(45) Date of Patent: May 6, 2014

(54) BRAKING SYSTEM FOR A VEHICLE

(75) Inventors: Jochen Mayer, Stuttgart-Botnang (DE); Niccolo Haegele, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 115 days.

(21) Appl. No.: 13/199,749

(22) Filed: Sep. 7, 2011

(65) Prior Publication Data

US 2012/0061193 A1 Mar. 15, 2012

(30) Foreign Application Priority Data

Sep. 13, 2010 (DE) .......................... 10 2010 040 657

(51) Int. Cl.
*B60T 11/12* (2006.01)
*B60T 7/04* (2006.01)

(52) U.S. Cl.
USPC .............................. 188/360; 188/355; 60/594

(58) Field of Classification Search
USPC ........... 188/106 P, 106 F, 355, 356, 357, 358, 188/359, 360; 60/547.1, 594
See application file for complete search history.

(56) References Cited

U.S. PATENT DOCUMENTS

| | | | |
|---|---|---|---|
| 5,070,699 A * | 12/1991 | Leiber et al. ..................... | 60/594 |
| 2006/0163941 A1* | 7/2006 | Von Hayn et al. .......... | 303/113.4 |
| 2010/0089054 A1* | 4/2010 | Leiber .......................... | 60/547.1 |
| 2010/0114444 A1* | 5/2010 | Verhagen et al. ............... | 701/70 |
| 2010/0187901 A1* | 7/2010 | Sonoda et al. .................. | 303/11 |

FOREIGN PATENT DOCUMENTS

DE 10 2007 016 864 10/2008

* cited by examiner

*Primary Examiner* — Thomas J Williams
(74) *Attorney, Agent, or Firm* — Kenyon & Kenyon LLP

(57) ABSTRACT

A braking system for a vehicle includes a brake assembly, a pedal simulator and a branching device for transmitting the pedal travel of the brake pedal between the brake assembly and the pedal simulator, the branching device having a transmission and distribution linkage in a distribution housing, which is to be operated by the brake pedal. The transmission and distribution linkage includes an adjusting spindle, which is fixedly mounted in the housing and runs transversely to the adjustment direction, and at least one transmission rod supported on the adjusting spindle and held adjustably in the axial direction of the adjusting spindle as well as transversely to the axial direction.

16 Claims, 2 Drawing Sheets

BRAKING SYSTEM FOR A VEHICLE

BACKGROUND OF THE INVENTION

1. Field of the Invention

The present invention relates to a braking system for a vehicle and a method for operating a braking system.

2. Description of Related Art

Published German patent application document DE 10 2007 016 864 A1 describes a braking system for a vehicle including an electromechanically boosted brake assembly and a pedal simulator which has the function of imparting a haptic brake sensation to the driver in an accustomed manner. The braking system is designed as a brake-by-wire system in which the movement of the brake pedal is detected by sensors, and control signals for operating an electric brake actuator in the brake assembly are generated via a regulating and control unit. Between the brake pedal and the brake assembly, there is a mechanical connection, although it is normally decoupled because of the design as a brake-by-wire system, and it becomes effective only in emergencies, for example, in the event of failure of the electromechanical brake force booster, in which the force exerted by the driver on the brake pedal functions as the actuating force for the brake assembly. In the normal case, however, the pedal force generated by the driver is not converted into a brake force.

The travel distance of the brake pedal between the pedal simulator and the brake assembly is distributed by way of a branching device. According to an embodiment variant specified in published German patent application document DE 10 2007 016 864 A1 the branching device is a transmission and distribution linkage to be operated by the brake pedal, including a guide component, which is connected to a rod of the pedal simulator as well as to the brake assembly and is adjusted by a coupling rod situated between the brake pedal and the guide component. The coupling rod is displaceably mounted in the guide component, the transmission to the pedal simulator and the brake assembly being controllable, depending on the position of the point of action of the coupling rod on the guide component.

Since the transmission and distribution linkage is fixedly connected to the adjusting rods of the pedal simulator and the brake assembly, the possibility that a travel distance is introduced into the pedal simulator and also into the brake assembly may not be ruled out in the case of a deflected position of the coupling rod connecting the guide component to the brake pedal.

BRIEF SUMMARY OF THE INVENTION

The object of the present invention is to design the distribution of the travel distance between a pedal simulator and a brake assembly in a braking system for a vehicle to be continuously adjustable. According to another aspect of the present invention, it should be possible to operate the braking system at a favorable energy efficiency.

A first aspect of the present invention relates to a braking system for a vehicle, in which the braking system includes a brake assembly, a pedal simulator and a branching device for transmission of the pedal travel of the brake pedal between the brake assembly and the pedal simulator. The branching device has a transmission and distribution linkage to be operated by the brake pedal in a distribution housing, to be adjusted between a first distribution position in which the travel distance of the brake pedal is introduced into the brake assembly and a second distribution position, in which the travel distance of the brake pedal is introduced into the pedal simulator.

To be sure that only the particular unit receives the pedal force and the pedal travel in the distribution positions so that unintentional activations of the other units are suppressed, the transmission and distribution linkage has an adjusting spindle running transversely to the adjustment direction and fixedly mounted in the housing and at least one transmission rod which is acted upon by the brake pedal and is held on the adjusting spindle, this transmission rod being held adjustably in the axial direction of the adjusting spindle and also transversely to the axial direction and thus in the adjustment direction of the pedal simulator as well as the brake assembly. Due to the placement of the adjusting spindle in a fixed position on the housing in the distribution housing of the branching device, the adjusting spindle functions only to provide bearing and guidance of the transmission rod, which is acted upon by the brake pedal and by an input rod to be operated by the brake pedal. The transmission rod may be adjusted along the adjusting spindle into the position in which a definite force transmission and travel distance transmission are possible either only on the pedal simulator or only on the brake assembly. These positions are referred to as distribution positions. In addition, any intermediate positions are also settable in which a percentage division of the travel distance or the actuating force on the pedal simulator and the brake assembly takes place. The percentage division of the travel distance is achieved by a corresponding positioning of the transmission rod along the axis of the adjusting spindle. The division may linearly or non-linearly depend on the prevailing position of the transmission rod on the adjusting spindle between the two distribution positions.

The transmission rod may execute two relative movements with respect to the adjusting spindle. On the one hand, the transmission rod is held displaceably or adjustably on the adjusting spindle in the axial direction, this movement of the transmission rod taking place also transversely to the adjustment direction of the brake pedal movement and the operation of the pedal simulator as well as the brake assembly due to the placement of the adjusting spindle transversely to the adjustment direction in the distribution housing. It is provided in particular that the axis of the adjusting spindle is orthogonal to the adjustment direction.

On the other hand, the transmission rod may execute a relative movement with respect to the adjusting spindle in the adjustment direction. This movement is necessary to transmit the adjustment movement, which originates from the brake pedal, to the pedal simulator and/or the brake assembly. However, the adjusting spindle does not change its position in the adjustment direction.

According to an advantageous embodiment, it is provided that the adjusting spindle is designed as a threaded spindle on which the transmission rod is mounted. A rotation of the threaded spindle results in an adjustment of the transmission rod in the axial direction of the spindle without an actuator having to act directly on the transmission rod. It is sufficient to drive the spindle to rotate via an actuator, in particular an electric motor, whereupon the transmission rod is adjusted along the longitudinal axis of the spindle until reaching the desired position.

However, it is in principle also possible to adjust the position of the transmission rod on the adjusting spindle directly via a drive unit, preferably an electric motor.

In another advantageous embodiment, a tilt lever is assigned to the transmission rod which is mounted tiltably on the one hand on the pedal simulator and, on the other hand, on an output rod which operates the brake assembly. The transmission rod operates the tilt lever, the transmission rod being adjustably supported on the tilt lever and a corresponding distribution of the adjustment movement or the actuating force into the pedal simulator and the brake assembly being achieved, depending on the position of the force application point of the transmission rod on the tilt lever.

In another advantageous embodiment, a total of two transmission rods situated symmetrically with respect to a central axis are supported on the adjusting spindle, these rods being adjustable out of a shared middle position, which represents one of the distribution positions, along the adjusting spindle in the opposite directions to reach the second exterior distribution position. A uniform distribution of force and support are achieved via the two transmission rods and their symmetrical placement in the distribution housing as well as the symmetrical movement along the axis of the adjusting spindle, thus preventing the risk of undesirable skewed and inclined positions and tilting and the resulting undesirable partial transmission of the travel distance to the other unit. A tilt lever is advantageously assigned to each transmission rod, each of the two tilt levers being pivotably connected to the pedal simulator and also to the brake assembly. It may be advantageous to position the pedal simulator symmetrically to an output rod which operates the brake assembly, for example, in such a way that the pedal simulator encompasses the output rod so that the pedal simulator and the output rod are situated coaxially to one another. In an application via two transmission rods having one tilt lever each, both tilt levers have a shared connection point on the transmission rod and are pivotably coupled to a section of the pedal simulator at their opposite exterior end. In the distribution position of the transmission rods in which the pedal simulator is to be operated, the transmission rods are in their exterior position, whereas in the distribution position, for applying the brake assembly both transmission rods are situated centrally in the distribution housing.

Another aspect of the present invention refers to a method for operating a braking system for a vehicle, the braking system having a brake assembly, a pedal simulator and a branching device for pedal travel transmission of the brake pedal between the brake assembly and the pedal simulator. The branching device is designed as described previously, if necessary.

In the initial state of the braking system, the branching device is in a position activating the brake assembly, so that each operation of the brake pedal is transferred directly into an adjustment movement for application of the brake assembly. This has the advantage that the work applied by the driver for operating the brake pedal is also converted into a brake force. This reduces the energy expenditure required for the brake force boosting, since for setting a setpoint brake force via brake force boosting, only that portion need be generated which is reduced by the part of the driver's brake force.

In addition, it is provided that for setting the setpoint brake force, the branching device is adjusted in such a way that the brake force generated via the brake assembly—driver's part including the brake force boosting—and a brake force acting on the vehicle and generated outside of the braking system are added up overall to yield the setpoint brake force. This type of operation is suitable in particular in electric vehicles and hybrid vehicles, which have an electric motor in the drive train exerting a brake force on the vehicle during recuperation operation. This brake force is generated outside of the braking system in the drive train of the vehicle and may be taken into account via the method according to the present invention, in such a way that the brake component generated in the braking system is reduced accordingly to achieve the setpoint brake force. A corresponding portion of the brake pedal travel generated by the driver may be introduced into the pedal simulator via the branching device to have the greatest possible portion of the brake force generated via devices outside of the braking system, for example, generators in the most favorable manner possible in terms of energy. If the setpoint brake force is generated alone via the devices outside of the braking system, then the pedal travel of the brake pedal is directed via corresponding adjustment of the branching device into the pedal simulator. Regardless of the generation of the brake torque outside of the brake assembly, this has the advantage for the driver of being an accustomed haptic brake sensation because the distribution between the pedal simulator and the brake assembly has no feedback effect on the brake pedal and therefore remains unnoticed by the driver.

The method according to the present invention takes place in a regulating or control unit, which is part of the braking system and communicates with the braking system.

BRIEF DESCRIPTION OF THE DRAWINGS

Additional advantages and advantageous embodiments are described in the following detailed description and drawings, wherein.

DETAILED DESCRIPTION OF THE INVENTION

Figure 1:
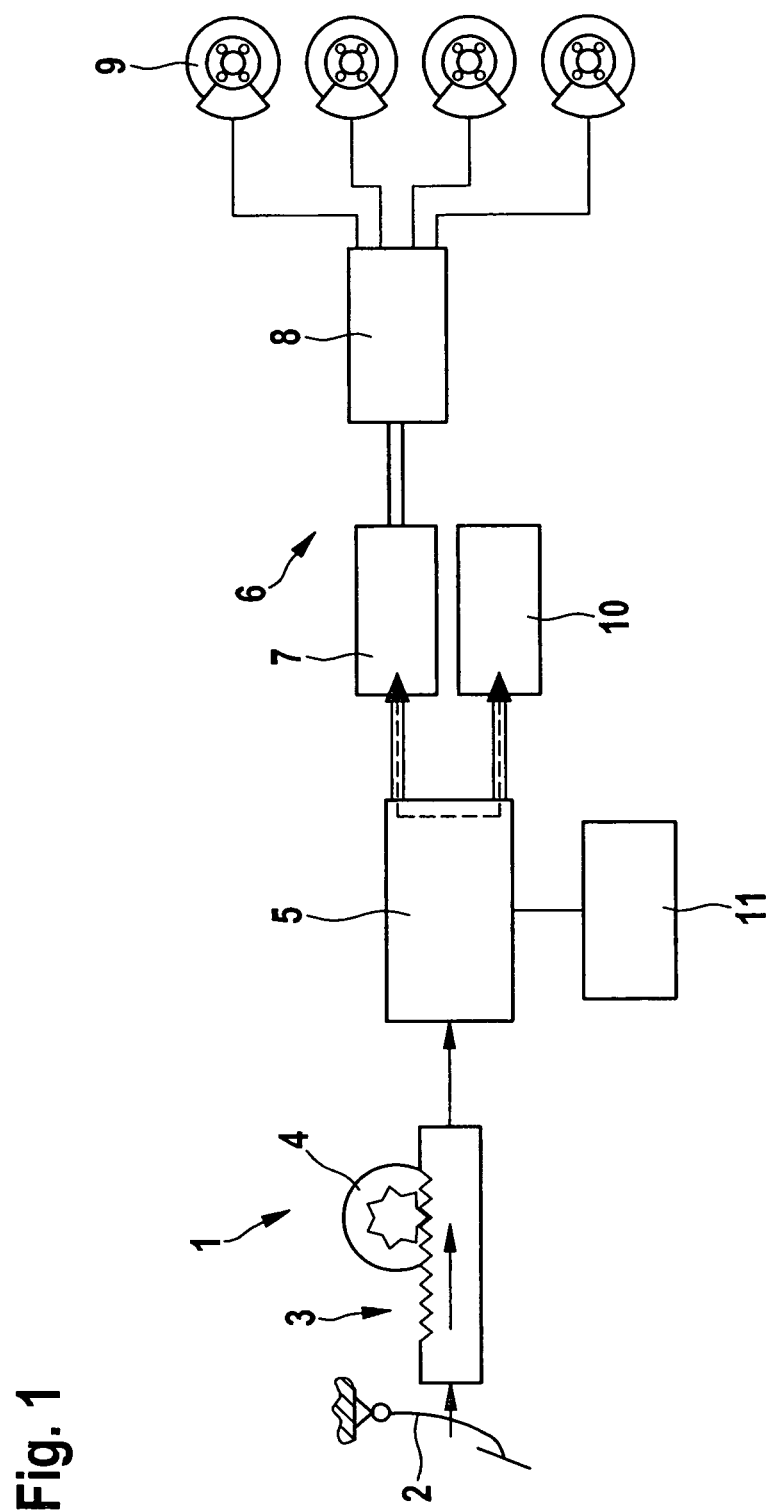
FIG. 1 shows a schematic diagram of a braking system in a vehicle having a brake assembly and a pedal simulator as well as a branching device for transmission of the pedal travel between the brake assembly and the pedal simulator.

FIG. 1 shows a braking system 1 for a vehicle having a brake pedal 2 for operating the brake, a brake force booster 3 having an electric servo motor 4, for example, a branching device 5, a brake assembly 6 and a pedal simulator 10. Brake assembly 6 includes a main brake cylinder 7, a driver assistance system 8 such as an antilock braking system ABS, a traction control system ASR or an electronic stability program ESP as well as wheel brakes 9, which are assigned to each vehicle wheel as friction brakes. Main brake cylinder 7 and pedal simulator 10 are each connected directly downstream from branching device 5.

The driver specifies a travel distance by operating brake pedal 2, which is boosted in brake force booster 3, which may be designed as an electromechanical booster, via electric servo motor 4. In branching device 5, the travel distance is directed either into brake assembly 6 or into pedal simulator 10 or proportionately into both units, depending on the requirements. Branching is performed continuously, so that the entire brake travel is directed either into brake assembly 6 or into pedal simulator 10 or into both units in any division ratio. The division is accomplished via an actuator in branching device 5 as a function of control signals generated in a regulating and control unit 11. Via the signals of regulating and control unit 11, a setpoint brake force is set in the vehicle in which the actuating force exerted by the driver on brake pedal 2, the brake force boosting in brake force booster 3 and brake forces outside of braking system 1 are taken into account. In the normal state or the initial state, there is a continuous connection from brake pedal 2 to brake assembly 6, so that the actuating force exerted by the driver results in a defined brake force component in brake assembly 6. Modifications in the brake force may be implemented via driver assistance system 8.

Depending on the level of the setpoint brake force to be set, which is obtained in the brake pedal as a function of the pedal travel, as well as the brake forces acting in the vehicle, which may also originate from units outside of braking system 1, a portion of the travel distance is directed into brake assembly 6 or pedal simulator 10 through a corresponding action upon branching device 5. For example, if the electric motor in the drive train of a hybrid vehicle is operated for recuperation in the braking mode, this results in a brake torque acting on the vehicle, which represents a corresponding portion in the setpoint brake force. Inasmuch as the setpoint brake force is supplied via the brake torque alone, which originates from the electric drive motor during recuperation mode, the brake pedal travel is conveyed to pedal simulator 10 via a corresponding adjustment of the branching device, so that no additional brake force is generated in brake assembly 6. If the portion generated via the electric drive motor during recuperation mode is not sufficient to achieve the setpoint brake force, branching device 5 is adjusted by control signals of regulating and control unit 11 in such a way that a corresponding portion is conveyed to brake assembly 6 to generate a brake force.

Figure 2:
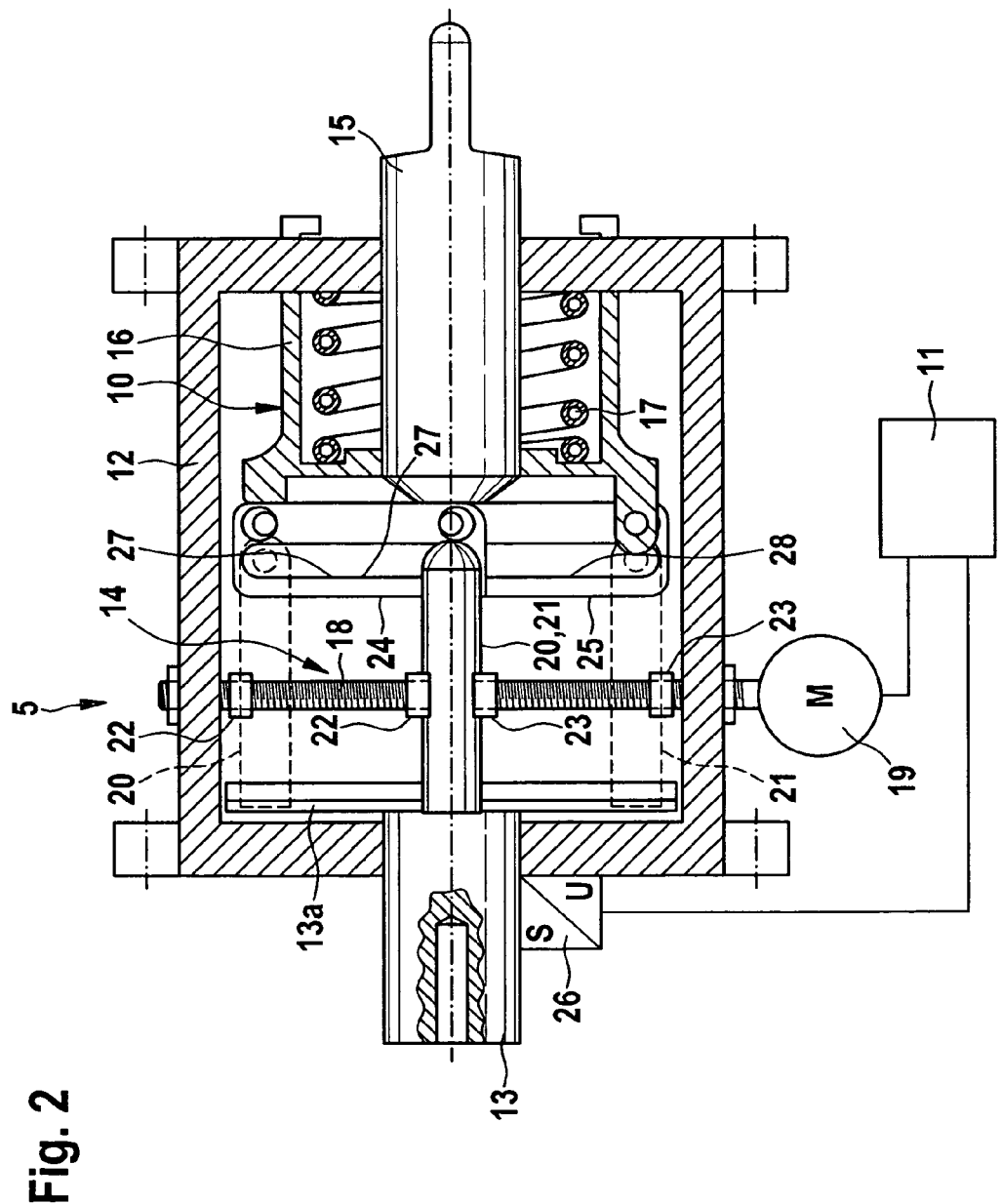
FIG. 2 shows the branching device in a detailed view.

FIG. 2 shows branching device 5 in detail. Branching device 5 includes a distribution housing 12 into which an input rod 13 protrudes at one end, this rod being operated by brake pedal 2 or at the output end of brake force booster 3 (FIG. 1). Coaxially to input rod 13 there is an output rod 15 on the opposite side of distribution housing 12, this output rod operating brake assembly 6. Between input rod 13 and output rod 15, there is a transmission and distribution linkage 14 in distribution housing 12 for transfer of the movement between rods 13 and 15.

In addition, pedal simulator 10 is integrated into distribution housing 12. Pedal simulator 10 includes a pot-shaped simulator housing 16 and a simulator spring 17, which is designed as a helical spring and is situated inside simulator housing 16, applying a force to simulator housing 16, which is mounted displaceably inside distribution housing 12 in the axial direction or the adjustment direction, into a starting position. Pedal simulator 10 is situated coaxially to output rod 15, simulator housing 16 and simulator spring 17, designed as a helical spring, encompassing output rod 15. Pedal simulator 10, like output rod 15 assigned to the brake assembly, may be acted upon by transmission and distribution linkage 14.

Transmission and distribution linkage 14 includes an adjusting spindle 18, which is designed as a threaded spindle and extends transversely, i.e., orthogonally to the adjustment direction or the axes of input rod 13, output rod 15 and pedal simulator 10 within distribution housing 12. Adjusting spindle 18 is mounted fixedly in distribution housing 12 but it may also rotate in the housing. An electric actuator 19, via which adjusting spindle 18 may be induced to rotate, is assigned to adjusting spindle 18. Electric actuator 19 is acted upon by control signals of regulating and control unit 11. Furthermore, sensor signals of a path sensor 26 may be supplied as input signals to regulating and control unit 11; the travel distance of input rod 13 is to be measured by path sensor 26.

In addition, transmission and distribution linkage 14 includes two transmission rods 20 and 21, which are supported on adjusting spindle 18. The bearing is provided via sliding shoes 22 and 23, which mesh with the thread of adjusting spindle 18, so that during a rotation of adjusting spindle 18, sliding shoes 22 are adjusted in the direction of the axis of adjusting spindle 18, i.e., transversely to the adjustment direction of input rod 13. Depending on the direction of rotation of adjusting spindle 18, both transmission rods 20, 21 move between the middle position represented by a solid line, representing a first distribution position, and an outside position representing a second distribution position. The adjustment movements of sliding shoes 22, 23, including transmission rods 20 and 21 attached thereto, are in opposite directions.

Sliding shoes 22, 23 also permit an axial displacement movement of transmission rods 20, 21 in the direction of actuation of input rod 13 with respect to adjusting spindle 18. Input rod 13 is provided with a widened flange 13a inside distribution housing 12, this flange extending over the width of the housing with transmission rods 20, 21 supported on it. In a translational actuation of input rod 13, transmission rods 20, 21 are also adjusted translationally in the direction of the axis of input rod 13.

Furthermore, two tilt levers 24 and 25, each being connected in an articulated manner to simulator housing 16 at one end and connected in an articulated manner to output rod 15 at the other end, belong to transmission and distribution linkage 14. In the area of output rod 15, both tilt levers 24, 25 have a shared joint. Each tilt lever 24, 25 is provided with an engagement groove 27 and 28, extending parallel to the axis of adjusting spindle 18 in the middle position shown here and in which in each case one transmission rod 20 and 21 is displaceably guided. Transmission rods 20, 21 are also displaceably guided on flange 13a in the area of their opposite end, so that transmission rods 20, 21 may be displaced in the axial direction of adjusting spindle 18 without changing their angular position.

In the middle position of transmission rods 20 and 21 represented by a solid line, these transmission rods are situated on a line with input rod 13 and output rod 15, so that each axial actuation of input rod 13 is transmitted directly via transmission rods 20, 21 into a corresponding actuation of output rod 15. Due to the articulated bearing of tilt levers 24 and 25, pedal simulator 10 remains unaffected in the middle position of transmission rods 20, 21 so that no actuation of input rod 13 is introduced into pedal simulator 10.

In the second distribution position according to the dash-dot line in the diagram, both transmission rods 20, 21 are located in proximity to the corresponding wall of distribution housing 12 in exterior opposing positions. In this second distribution position, transmission rods 20, 21 are in direct proximity to the deflection point of tilt levers 24, 25, each on one side of simulator housing 16. Each actuation of input rod 13 is transferred into an actuation of pedal simulator 16, which is then displaced against the force of simulator spring 17 onto the wall side of distribution housing 12 opposite input rod 13. Output rod 15 remains unaffected in this position.

In the intermediate positions between the two distribution positions, there is a percentage division of the actuating force, which is introduced via input rod 13 between pedal simulator 10 and output rod 15.

What is claimed is:
1. A braking system for a vehicle comprising:
   a brake assembly;
   a pedal simulator; and
   a branching device for transmitting a pedal travel of a brake pedal between the brake assembly and the pedal simulator;
   wherein:
      the branching device includes a distribution housing and, in the distribution housing, a transmission and distribution linkage; and
      the linkage:
         is operable by the brake pedal;

is adjustable between (a) a first distribution position in which a travel distance of the brake pedal is directed into the brake assembly, and (b) a second distribution position in which the travel distance of the brake pedal is directed into the pedal simulator; includes:
    an adjusting spindle that is fixedly mounted in the housing and runs transversely to a direction of the adjustment; and
    at least one transmission rod:
        that is held on the adjusting spindle;
        that is arranged to be acted upon by the brake pedal; and
        whose position is adjustable in the axial direction of the adjusting spindle as well as transversely to the axial direction of the adjusting spindle.

2. The braking system as recited in claim 1, wherein the adjusting spindle is a threaded spindle on which the transmission rod is supported.

3. The braking system as recited in claim 1, wherein a drive unit is provided for adjusting the transmission rod in the axial direction.

4. The braking system as recited in claim 3, wherein the drive unit is an electric motor.

5. The braking system as recited in claim 2, wherein the drive unit twists the adjusting spindle.

6. The braking system as recited in claim 1, wherein a tilt lever is assigned to the transmission rod, the tilt lever being tiltably mounted on the pedal simulator and on an output rod, which operates the brake assembly.

7. The braking system as recited in claim 1, wherein two transmission rods situated symmetrically to a middle axis are supported on the adjusting spindle and are adjustable from a shared middle position, which represents the first distribution position, into opposite directions to reach the second distribution position.

8. The braking system as recited in claim 1, wherein the pedal simulator is integrated into the distribution housing.

9. The braking system as recited in claim 1, wherein the pedal simulator is situated symmetrically to an output rod operating the brake assembly.

10. The braking system as recited in claim 1, wherein the transmission rod is to be operated by an input rod protruding into the distribution housing and acted upon by the brake pedal.

11. A method for operating a braking system for a vehicle, the braking system including a brake assembly, a pedal simulator, and a branching device for transmitting a pedal travel of a brake pedal between the brake assembly and the pedal simulator, the method comprising:
    adjusting the branching device from a position, in an initial state, for activating the brake assembly to a position for setting a setpoint brake force, the setpoint brake force being formed by a combination of a non-zero brake force generated via the brake assembly and a non-zero brake force generated outside of the braking system.

12. The method as recited in claim 11, wherein brake force boosting is generated in the brake assembly via a brake force booster.

13. The method as recited in claim 11, wherein a continuous distribution between the brake assembly and the pedal simulator is made possible via the branching device.

14. The method as recited in claim 11, wherein the brake force generated outside of the braking system originates from recuperation operation of an electric motor situated in the drive train of the vehicle.

15. A regulating and control unit for implementing the method as recited in claim 11.

16. The method as recited in claim 11, wherein the branching device has a transmission and distribution linkage with a threaded adjusting spindle.

* * * * *